United States Patent
Toepfl et al.

(10) Patent No.: US 12,041,953 B2
(45) Date of Patent: Jul. 23, 2024

(54) METHOD AND SYSTEM FOR PROCESS MONITORING THE TREATMENT OF MEDIA

(71) Applicant: ELEA VERTRIEBS-UND VERMARKTUNGSGESELLSCHAFT MBH, Quakenbruck (DE)

(72) Inventors: Stefan Toepfl, Osnabruck (DE); Julian Witt, Osnabruck (DE); Claudia Siemer, Bersenbruck (DE)

(73) Assignee: ELEA SERVICE GMBH, Quakenbruck (DE)

( * ) Notice: Subject to any disclaimer, the term of this patent is extended or adjusted under 35 U.S.C. 154(b) by 970 days.

(21) Appl. No.: 16/963,310

(22) PCT Filed: Jan. 10, 2019

(86) PCT No.: PCT/EP2019/050534
§ 371 (c)(1),
(2) Date: Jul. 20, 2020

(87) PCT Pub. No.: WO2019/149492
PCT Pub. Date: Aug. 8, 2019

(65) Prior Publication Data
US 2020/0359659 A1     Nov. 19, 2020

(30) Foreign Application Priority Data
Jan. 31, 2018   (DE) ......................... 102018201480.9

(51) Int. Cl.
| | |
|---|---|
| *A23L 3/32* | (2006.01) |
| *A23C 3/07* | (2006.01) |
| *A23L 2/50* | (2006.01) |
| *A23L 3/00* | (2006.01) |

(52) U.S. Cl.
CPC ............... *A23L 3/32* (2013.01); *A23C 3/07* (2013.01); *A23L 2/50* (2013.01); *A23L 3/001* (2013.01); *A23L 3/003* (2013.01); *A23V 2002/00* (2013.01)

(58) Field of Classification Search
CPC ... A23C 3/07; A23L 2/50; A23L 3/003; A23L 3/001; A23L 3/32; A23L 2/48; A23L 3/22; A23V 2002/00
(Continued)

(56) References Cited

U.S. PATENT DOCUMENTS

| | | | |
|---|---|---|---|
| 4,695,472 A | | 9/1987 | Dunn et al. |
| 4,838,154 A | * | 6/1989 | Dunn ........................ A23L 3/32 99/451 |

(Continued)

FOREIGN PATENT DOCUMENTS

DE          3708775 A1     9/1988

OTHER PUBLICATIONS

Henry Jäger. "Process performance analysis of puled electric field (PEF) food applications vorgelegt von Diplom-Ingenieur" *Berlin*, Jan. 1, 2011 (Jan. 1, 2011), p. 83, Retrieved from the Internet: https://d-nb.info/1031756574/34 [retrieved on Mar. 20, 2019] XP055572216 1.2 Treatment chamber design 1.5 Process integration.
(Continued)

*Primary Examiner* — Phuong T Nguyen
(74) *Attorney, Agent, or Firm* — Mark P. Stone

(57) ABSTRACT

A system for process monitoring of the treatment of media, in particular a HACCP-compliant system for the preservation of foods. In order to ensure and standardize successful treatment, system comprises an electroporator for treating a medium with a pulsed electric field, at least one measuring device for determining a change of a condition parameter of
(Continued)

the medium caused by the treatment with the pulsed electric field, and an evaluation device for comparing the determined change of the condition parameter to a predetermined change target value and for outputting a warning signal once the difference between the determined change and the predetermined change target value exceeds a limit value.

20 Claims, 1 Drawing Sheet

(58) Field of Classification Search
USPC .......... 99/361, 451, 477, 483, 497; 426/232, 426/237, 238, 407, 521
See application file for complete search history.

(56) References Cited

U.S. PATENT DOCUMENTS 6,093,432 A * 7/2000 Mittal ...................... A23C 3/00
422/186.04
2002/0168456 A1* 11/2002 Robbins ................... A23L 3/32
426/231

OTHER PUBLICATIONS

Min, S., et al. Commercial-scale pulsed electric field processing of orange juice. Journal of food science, 2003, 68. Jg., Nr. 4, S. 1265-1271, ISSN: 1750-3841.

* cited by examiner

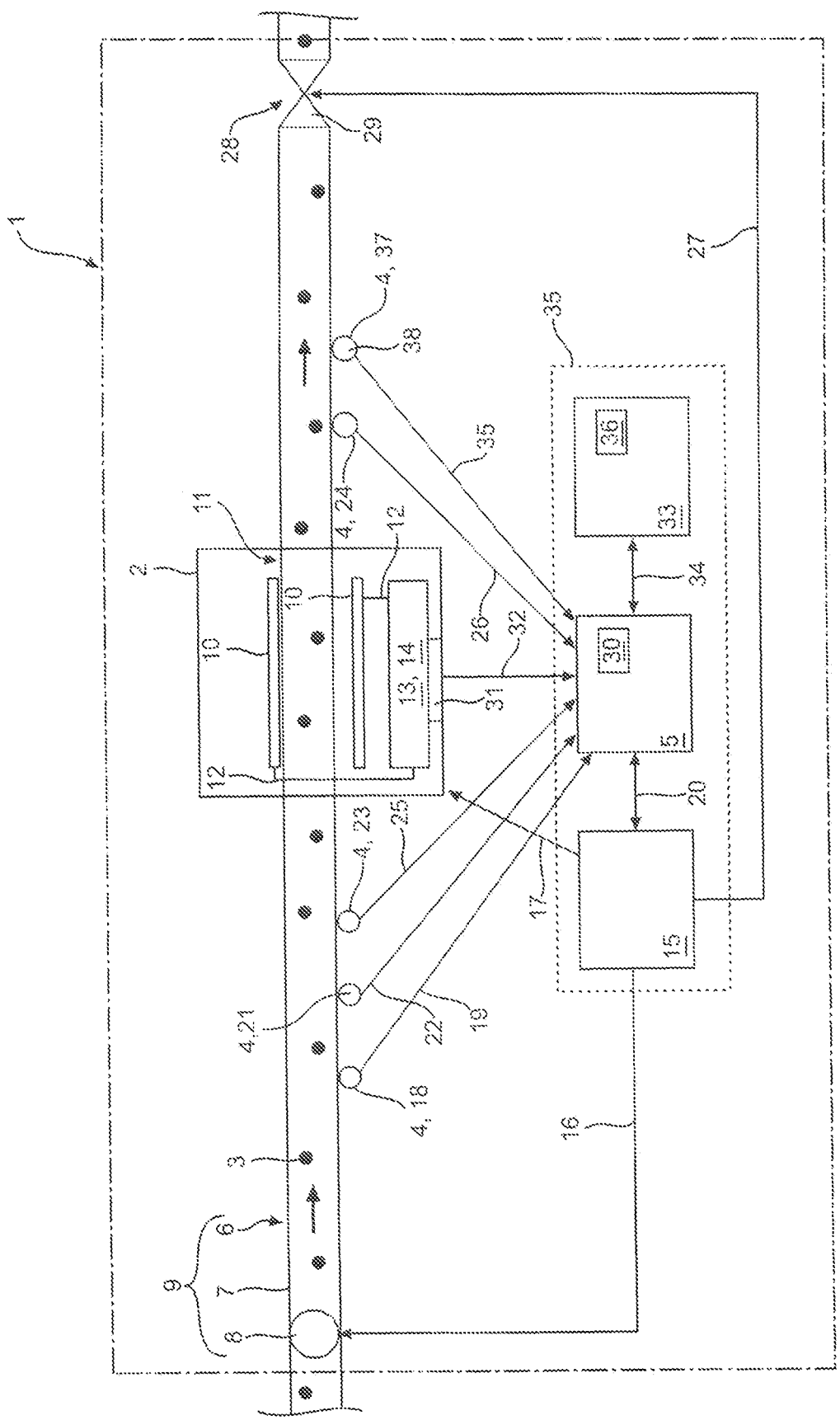

METHOD AND SYSTEM FOR PROCESS MONITORING THE TREATMENT OF MEDIA

The present invention relates to a system for process monitoring of the treatment of media, in particular a HACCP-complaint system for the preservation of foods.

The present invention further relates to a method for monitoring a process for treating media, in particular HACCP-compliant method for the preserving foods.

Quality assurance plays an important role in the production and treatment of foods. Series of standards EN ISO 9000 has established standards documenting the principles for quality management measures and facilitating the mutual understanding of quality management systems at a national and international level. The Hazard Analysis and Critical Control Points (HACCP) concept is a well-structured tool geared toward preventive measures and serves to prevent food-related hazards that can cause disease or injury to consumers. Both the German Food Hygiene Regulation as well as a European Community Regulation provide for the application of the HACCP concept in all companies involved in the production, processing and distribution of foods.

Quality assurance includes different approaches and measures to ensure defined quality requirements regarding the end product. One quality feature of media, in particular of foods, is its shelf life. To extend the shelf life of foods, there are a variety of preservation methods that stop or at least slow down the spoilage of the food and its ingredients becoming inedible or harmful decomposition products. The decomposition that preservation is to prevent usually occurs due to biochemical processes such as microbial or enzymatic activity. The most common application is the preservation of foods in the framework of Industrial production, which is obtained on an industrial scale, for example, by heating, distillation, cooling or other measures.

Electroporation is a method of making cell membranes temporarily or permanently permeable. This technique is used, inter alia, in microbiology to infiltrate DNA into cells. Electroporation is used also in the field of food and bioprocess engineering to improve mass transport processes or the inactivation of microorganisms.

One advantage of electroporation is that it is a non-thermal method and can therefore be used for the preservation of temperature-sensitive media, for example, dairy products, fruit juices or smoothies, in order to improve their preservation by the inactivation of microorganisms.

In electroporation, short pulses of electric fields are generated and perforate the cell membranes. Critical to successful electroporation are a variety of different parameters, such as the strength of the electric field, the pulse shape, the number of pulses or the pulse duration. There are no established dose or intensity standards for the treatment of media by way of electroporation. The process parameters are therefore selected and optimized on a case-by-case basis by the user, which is time consuming and requires a high degree of technical and scientific expertise.

It is therefore en object of the present invention to provide a method and a system for process monitoring of the treatment of media which can be standardized and reliably ensures the successful treatment of the media.

The above-mentioned system for process monitoring of the treatment of media satisfies this object in that it comprises the following components: an electroporator for treating the medium with a pulsed electric field, at least one measuring device for determining a change of a condition parameter of the medium caused by the treatment with the pulsed electric field, and an evaluation device for comparing the determined change of the condition parameter to a predetermined change target value, and for outputting a warning signal once the difference between the determined change and the predetermined change target value exceeds a limit value.

The above-mentioned method satisfies this object by treating the medium with a pulsed field, determining the change of a condition parameter of the medium caused by the treatment with the pulsed electric field, and comparing the determined change to a predetermined change target value, and outputting a warning signal if the difference between the determined change and the predetermined change target value exceeds a limit value.

By coupling an electroporator to a measuring device and an evaluation device, it becomes possible to reliably ensure the intended electroporation treatment of the medium in a standardized manner. This is achieved in that the system monitors the change of a specific condition parameter of the medium to be treated due to the electroporation and determines whether this change corresponds to a desired change target value within the usual tolerances.

Observing these tolerances ensures that the treatment has been successful, for example, that a food has been preserved to specification. In addition, the system or method according to the invention immediately outputs a warning if the electroporation (also referred to below as PEF (pulsed electric field) treatment) did not have the desired effect, for example, the number of harmful microorganisms in the medium has not been reduced to a desired minimum.

For the purposes of this application, a "medium" is to be understood as meaning matter or a substance. This includes in particular food.

"Treatment" is understood to mean a process which changes parameters of the medium and brings about, for example, a structural change or material change of the medium. Treatments within the meaning of the present invention include the preservation of foods, which depends in particular on the number of harmful microorganisms in the medium.

A "condition parameter" (or condition variable) is a macroscopic physical variable which describes the condition of the medium, for example, the pressure, temperature, volume, number of particles or quantity of matter, entropy, enthalpy, pH value or germ load or number of microorganisms, respectively.

The "change target value" is a predefined and predetermined value for the condition parameter that is characteristic of the intended treatment of the medium being successful. The change target value can be determined by standard experiments on a laboratory scale.

A "warning signal" is understood to mean any type of indication that is output by the evaluation device and indicates that the predetermined change target value has not been reached, i.e. that a malfunction and unsuccessful PEF treatment of the medium has occurred. Possible warning signals are optical signals, audio signals or electrical or data signals which can be detected by a recipient, for example, the operator of the system or a display unit such as a lamp, a loudspeaker or a computer.

The "value" reflects a tolerance range around the predetermined change target value, where the difference takes into account both the deviation above and below the change target value and therefore can cover both under-treatment, i.e. insufficient treatment, as well as over-treatment, in which the medium was treated too much.

The invention can be further improved by the following developments and advantageous embodiments, which are advantageous each by itself and can be combined with one another as desired.

According to one embodiment, the system further comprises a conveying line for transporting the medium. The system can be configured both for continuous process monitoring, preferably online, as well as for batch monitoring, in which the medium is transported along the conveying line to the electroporator, treated in the electroporator, and subsequently discharged from the electroporator. In the method, the medium can therefore be continuously passed through the electroporator as well as intermittently passed to the electroporator and discharged therefrom. The conveying line can comprise tubing and/or a conveyor belt. Tubing can be used for the treatment of pumpable media, for example, liquid media such as fruit juices, smoothies or dairy products. For solid media or bulk materials, a conveyor belt or an auger can be used as a conveying line. The system can further comprise a drive for transporting the medium, for example, a pump or a motor. The system can comprise, for example, a conveyor system with a conveying line and a drive for transporting the medium on the conveying line.

According to one further embodiment, the electroporator can comprise at least two electrodes connected to a pulse generator. The electrodes can preferably be made of stainless steel or titanium, even if they do not need to be exposed to the medium to be treated. The two electrodes form a capacitor, and the space between the two electrodes forms the treatment chamber of the electroporator in which the pulsed electric field is generated. The electrodes can be arranged coaxially, collinearly, conically or parallel to each other and create a homogeneous electric field for the uniform treatment of the medium. For example, a high-voltage pulse generator, such as a Marx generator, can be the pulse generator as a voltage source with which electrical pulses of a high voltage in the kilovolt range and of short duration in the micro to millisecond range can be generated.

The system can further comprise a control unit for adjusting a conveying speed of the transported medium and/or at least one operating parameter of the electroporator. For example, the control unit can adjust the speed of the drive in order to obtain a desired conveying speed. The control unit, which can be connected via a control ine to the conveying line or the drive and/or the electroporator, respectively, in particular to its pulse generator, can adjust to a desired value, for example, the field strength generated, the pulse duration, the pulse frequency, the pulse shape, the pulse voltage, the strength of current and/or the specific energy, which is entered per unit time into the medium to be treated, as the operating parameters of the electroporator.

In the method according to the invention, the conveying speed of the transported medium and/or an operating parameter of the electroporator, for example, the field strength, the pulse duration, the pulse frequency, the pulse shape, the pulse voltage, the polarity, the strength of current and/or the specific energy can therefore be adjusted.

The system according to the invention can further comprise a blocking device for preventing the medium from exiting the system when the warning signal is output. The blocking device can contain, for example, a valve which is closed by the evaluation device and prevents media from exiting the system when a warring signal has been output. The blocking device can also be such that the direction of transport of the medium is reversed and continued forwarding of the medium along the process line is prevented. The blocking device can be coupled to the evaluation device in a manner transmitting signals so that the medium exiting is automatically prevented once a warning signal has been output by the evaluation device. The coupling can be effected both directly and indirectly, for example, via the control unit of the system.

When coupling or data transmission is spoken of in the present application, then this includes both a wired as well as a wireless coupling or transmission, respectively, for example via lines or by radio technology. In the method according to the invention, the medium exiting can accordingly be stopped automatically when a warning signal has been output.

In one further embodiment, the measuring device can comprise at least one thermometer for determining the temperature increase. The measuring device can preferably comprise at least one inlet thermometer for determining the temperature of the medium before it enters the electroporator and at least one output thermometer for determining the temperature of the medium after it exits the electroporator, where the temperature increase can be determined in continuous operation. It has surprisingly been found that the temperature increase represents a reliable medium parameter that is characteristic of successful media treatment, in particular with regard to the preservation of foods by the inactivation of microorganisms. The measuring device, for example the at least one thermometer or the at least one input or the at least one output thermometer, respectively, can be connected to the evaluation device in a manner transmitting signals and, in this way, forward the change of the determined condition parameter, for example, a temperature increase, from the measuring device to the evaluation device.

According to one further embodiment, the conveying speed of the medium is determined when transported through the electroporator. For this purpose, the system can comprise a speed sensor for determining the conveying speed of the medium transported on the conveying line through the electroporator. The speed sensor can contain, for example, a flow measuring unit, by use of which a flow signal being characteristic of the conveying speed can be output. In this way, the amount of medium transported per unit time can be determined. The conveying speed determined can be output to the control unit, which in turn adjusts the parameters of the electroporator in dependence of the determined conveying speed to ensure that sufficient treatment of the medium takes place during regular operation, for example, that the energy required for the inactivation of microorganisms is introduced into the medium by the electroporator. The speed sensor further allows a closed control loop to maintain a certain conveying speed.

In a further embodiment, the system comprises an energy measuring unit for determining the specific energy input into the medium during the treatment with the pulsed electric field. For example, an oscilloscope can be used as the energy measuring unit. The energy measuring unit can determine the specific energy input in dependence of the determined conveying speed and the operating parameters of the electroporator. When the energy measuring unit is coupled to the control unit, a closed control loop can be established to ensure that either the conveying speed and/or the operating parameters of the electroporator are adjusted accordingly to obtain a certain specific energy input into the medium during treatment in the electroporator as required for the intended treatment of the medium.

In one further embodiment, the evaluation device comprises an evaluation device for comparing the determined temperature increase of the medium to a predetermined temperature increase and for outputting a warning signal once the difference between the determined temperature increase and the predetermined temperature increase exceeds a limit value. This embodiment is based on the surprising finding that the introduction of a certain amount of specific energy into the electroporator required for the inactivation of microorganisms is reflected macroscopically in a specific temperature increase of the medium. Although electroporation is basically a non-thermal treatment method, small temperature increases of around 20° to 30° C. can nevertheless occur and can be used as a measure of successful food preservation. According to one embodiment, the target temperature increase can be calculated according to the following formula:

$$\Delta T = \frac{W_{spec}}{c_p} * f,$$

where $W_{spec}$=specific energy input, $c_p$=specific head capacity of the product and f=correlation factor. The correlation factor depends inter alia on the medium to be treated, its pH value and/or the treatment intensity in the electroporator.

According to one further embodiment, the system can comprise a protocol or logging unit for logging operating parameters of the system. Logged and e.g. stored in a memory of the logging unit can be, in particular over its temporal course, all parameters of the system, such as conveying speed of the medium, pH value of the medium, pressure of the medium, temperature of the medium, or operating parameters of the electroporator.

The logging unit enables the documentation of the system according to the invention during operation and simplifies troubleshooting or allows for conclusions about the treatment of certain batches of the medium, which have possibly not been treated properly.

According to one further embodiment, the system can further comprise a pressure measuring unit for determining the pressure in the medium. For instance, k can be detected whether the treatment ne is filed with product and whether sufficient back pressure to suppress the release of dissolved gases is present. The pressure measuring unit can also in particular measure the pressure in the medium after treatment in the electroporator. For example, too intensive treatment of the medium can be detected in the electroporator in this manner, which is reflected, for example, in foaming due to an undesirable chemical reaction and an associated pressure increase in the medium. The system can further comprise an overpressure indicator for outputting a warning signal once the determined pressure in the medium exceeds or drops below a predetermined maximum pressure. The overpressure indicator can be integrated into the pressure measuring unit, so that the pressure measuring unit directly outputs the warning signal, e.g. sounds an alarm. The overpressure indicator can also be contained in the evaluation device, so that the evaluation device can output different types of warning signals, for example, a warning signal in the presence of an undesired overpressure and different warning signal for an undesired deviation from a predetermined change target value, for example, a desired temperature increase during treatment in the electroporator.

It can also be provided to measure the pH value of the medium, in particular, the pH value prior to entry into the electroporator. For this purpose, the system according to the invention can comprise a pH measuring device for determining the pH value of the medium, preferably of the medium before it enters the electroporator. The pH value of the medium can be a measure of the loading of the medium with microorganisms. Experience has shown that the less acidic or alkaline the medium, i.e. the further the pH value of the medium deviates from the physiological pH value (neutral pH around pH 7), the lower the microorganism load on a medium. By way of determining the pH value using a pH measuring unit, it is then possible to estimate the microorganism load of the medium to be treated. This estimate can in turn provide information about how much a condition parameter of the medium is to be changed in the pulsed electric field. The present change target value can therefore be predefined in dependence of the determined pH value and, if necessary, be adjusted continuously during operation. In addition, by measuring the pH value, it can be distinguished whether a medium or water (inter alia with a cleaning solution) is present in the system. Once the medium is in the system, the system can be driven to the desired performance/intensity. For this purpose, the pH measuring unit can be connected to the evaluation electronics and/or the control unit in a manner transmitting signals. The system can also be assigned a pH value or a pH range for the medium to be treated which is characteristic of a proper state d the medium. For example, it may be necessary for some media to acidify them. If the step of acidification has been omitted by mistake, then the pH value of the medium is outside the predetermined range, which can be detected using the pH measuring unit. In this case, (the pH value of the medium determined by the pH measuring unit is outside the predetermined pH range for this medium) the system according to the invention outputs a warning signal.

In the following, the invention shall be described by way of example in detail with reference to the drawing using advantageous embodiments. The advantageous further developments and configurations illustrated there are each independent of each other and can be combined with one another, depending on the requirement of the application, where:

FIG. 1 shows an exemplary embodiment of a system according to the invention for process monitoring of the treatment of media.

A system 1 for the treatment of media according to the invention shall be presented below with reference to the schematic representation in FIG. 1. Within the context of this presentation, the method according to the invention for monitoring a process for the treatment of a medium shall also be described, which can be performed in particular using the system according to the invention, for example, the exemplary system of FIG. 1.

System 1 shown in FIG. 1 comprises an electroporator 2 for the treatment of a medium 3 (represented schematically by black dots ir FIG. 1) with a pulsed electric field. System 1 further comprises at least one measuring device 4 for determining a change of a condition parameter of medium 3 caused by the treatment with the pulsed electric field, and an evaluation device 5 for comparing the determined change of the condition parameter to a predetermined change target value and for outputting a warning signal once the difference between the determined change and the predetermined change target value exceeds a limit value.

In the embodiment shown, system 1 according to the invention comprises a conveying line 6 for transporting medium 3, for example, the foods to be preserved. Conveying line 6 in the exemplary embodiment of FIG. 1 comprises tubing 7 in which pumpable media, for example juices, smoothies or dairy products, can be transported. Conveying ine 6 can alternatively comprise a conveyor belt or an auger (not shown), for example, when solid media and bulk media are to be treated.

System 1 further comprises a drive 8 for transporting the medium on conveying line 6. Drive 8 can be, for example, a pump which pumps a fluid medium through tubing 7, or a motor which drives a conveyor belt or an auger. Conveying line 6, which is a tubing in the illustrated embodiment, and drive 8 together form a conveying system 9.

Conveying line 6 passes through electroporator 2, or in other words, electroporator 2 is arranged such that a medium 3 transported on conveying ine 6 can be treated with a pulsed electric field. Electroporator 2 comprises at least two electrodes 10 which form a capacitor 11 for generating an electric field in a treatment section of conveying line 6. Electrodes 10 of capacitor 11 are connected via power lines 12 to a voltage source 13. In the embodiment shown, the two electrodes 10 of capacitor 11 are arranged on opposite sides of conveying line 6 and parallel to each other. A homogeneous electric field for uniform treatment of media 3 can be generated with such an electrode arrangement. However, other variants of the electrode arrangement are also conceivable, for example, a coaxial, collinear or conical arrangement.

A pulse generator 14, for example, a high-voltage pulse generator, such as a Marx generator, can be used as a voltage source with which electrical pulses of a high voltage in the kilovolt range and of short duration in the micro to millisecond range can be generated. Electrodes 10 can be made, for example, of stainless steel or a titanium alloy.

The exemplary system of FIG. 1 further comprises a control unit 15 for adjusting a conveying speed of transported medium 3 and/or at least one operating parameter of electroporator 2.

Control unit 15 can be connected to drive 8 via a control line 16, and can in this way adjust the conveying speed, for example, the flowrate of the transported medium in tubing 7 by controlling a pump. In the embodiment shown, control unit 15 is connected via a further controlling 17 to electroporator 2 and in this way can control, for example, the field strength, the pulse duration, the pulse frequency, the pulse shape, the pulse voltage, the strength of current or the specific energy input of the electroporator. Of course, control lines 16 and 17 can be omitted if the data transmission between control unit 15 and drive 8 or electroporator 2 is wireless, for example using a radio connection. The arrow of control lines 16 and 17 pointing at drive 8 and electroporator 2, respectively, indicates that a control signal from control unit 15 to drive 8 or electroporator 2, respectively, can be output via these lines. Although this is not shown in FIG. 1, control line 16 or 17, respectively, can also be bi-directional, meaning that signals from drive 8 and electroporator 2 can be transmitted back to control unit 15. For example, drive 8 can send a conveying signal, which is characteristic of the operation of the drive, e.g. the pump pressure, via control line 16 back to control unit 15.

It applies for all lines that are presented in the context of this invention that they can be configured both in a wired as well as in a wireless manner and that signals or data are transmitted via these lines not only in the direction indicated by arrows, but also in the opposite direction.

By controlling both the conveying speed of the drive as well as the operating parameters of the electroporator, it can therefore be adjusted in the exemplary system 1 of FIG. 1 which specific energy is introduced by electroporator 2 into the medium conveyed on conveying line 6 during its treatment.

In the embodiment shown, system 1 further comprises another measuring device 4, namely a speed sensor 18 for determining the conveying speed of medium 3 transported on conveying line 6 through electroporator 2. Speed sensor 18 can be configured as a flow measuring unit with which a flow signal can be output. This flow signal can be transmitted via a signal ine 19 from speed sensor 18 to evaluation device 5. In evaluation device 5, the flow signal can be compared to a target value. If the current flow signal differs from the target signal, then evaluation device 5 can output a control signal via a further signal line 20 to control unit 15, which in turn forwards a control signal via signal line 16 to the drive, whereby a closed control loop for controlling the flow rate in system 1 according to the invention is realized. Of course, it is also possible that speed sensor 18 passes the signal that is characteristic of the conveying speed directly to control unit 15. Speed sensor 18 can also measure the resistance or the conductivity of medium 3 disposed on conveying line 9 and output a corresponding signal that is characteristic of the conductance or the resistance of the medium transported. This makes it easy to determine whether any medium 3 is conveyed at al. It is also possible to draw conclusions about the conveyed medium and the value that is characteristic of the resistance or the conductivity of medium 3 can also be taken into account by evaluation electronics 5 or control unit 15, respectively, for precisely adjusting the specific energy input.

Even if this is not shown in FIG. 1, it is of course also possible to provide a further measuring device which measures the resistance or the conductivity of medium 3 on conveying line 6 and is configured to output a signal that is characteristic of this parameter. Measuring the conductivity also makes it possible to determine whether medium 3 or water (possibly with a cleaning agent) is present in conveying line 6.

System 1 shown in FIG. 1 further comprises a pH measuring unit 21 for determining the pH value of medium 3 before it enters electroporator 2. This further measuring device 4, namely pH measuring unit 21, is therefore to be arranged in the flow direction illustrated by an arrow in the tubing 7 upstream of electroporator 2. This is not absolutely necessary for speed sensor 18. It can also be arranged in the flow direction downstream of electroporator 2.

The pH value of medium 3 can be characteristic of the loading of medium 3 with harmful microorganisms. For example, acidic or alkaline foods, whose pH values are further away from the physiologically neutral pH value of 7, tend to contain lower levels of harmful microorganisms. A low germ load, in turn, leads to a lower specific energy input into medium 3 being required by electroporator 2 in order to process medium 3 to be treated for reducing the microorganism load below a maximum value which is required to increase the shelf life of medium 3.

In the exemplary embodiment shown, pH measuring unit 21 is connected via a further signal line 22 to evaluation unit 5 in a manner transmitting signals. A signal that is characteristic of the pH value of medium 3, which is determined by pH measuring unit 21, can then be output to evaluation unit 5 via signal line 22. Evaluation device 5 can output this signal via signal ine 22 to control unit 15 which in turn outputs a corresponding control signal via line 17 to electroporator 2 for specifically adapting the electroporation treatment to medium 3.

In the exemplary embodiment of FIG. 1, system 1 comprises at least one thermometer for determining the temperature increase. The temperature is used as a condition parameter which is used by evaluation device 5, as shall now be explained in more detail. In the embodiment shown, system 1 comprises at least one inlet thermometer 23 for determining the temperature of the medium before it enters electroporator 2 and at least one outlet thermometer 24 for determining the temperature of the medium after it exits electroporator 2. The difference between the inlet and outlet temperature corresponds to a temperature difference which in the exemplary embodiment corresponds to the determined change of a condition parameter and in evaluation device 5 is compared to a predetermined change target value, i.e. a predetermined target temperature difference.

Inlet thermometer 23 and outlet thermometer 24 are connected via a signal line 25 and 26, respectively, to evaluation unit 5 in a manner transmitting signals. Temperature signals, which can be transmitted via corresponding signal ine 25 and 26, respectively, can therefore be output by thermometers 23 and 24 to evaluation unit 5. Evaluation unit 5 compares the inlet and the outlet temperature and first calculates the temperature difference as a determined change of the condition parameter. In evaluation unit 5, the determined temperature difference, i.e., the determined temperature increase of medium 3, is then compared to a predetermined target temperature increase. If the difference between the determined temperature increase and the predetermined target temperature increase exceeds a predetermined limit value, then the evaluation device outputs a warning signal. The warning signal output can be, for example, a visual or an audio signal in the form of a warning lamp or a warning siren which indicates improper treatment of the medium.

In the embodiment shown, the warning signal is first output by evaluation unit 5 via control line 20 to control unit 15 which then transmits it via a further control line 27 to a blocking device 28. Blocking device 28 prevents medium 3 from exiting system 1 when the warning signal is output.

In the embodiment illustrated, blocking device 28 is configured as a check valve 29 which in the flow direction is downstream of electroporator 2. Once a warning signal has been output by evaluation unit 5, check valve 29 is closed and medium 3 is prevented from exiting system 1 according to the invention. Alternatively, drive 8 could simultaneously be used as a blocking device in that the drive is stopped when a warning signal is output and the delivery of medium 3 on conveying line 6 is hated. Another option, which is not shown, would be to use a T-valve instead of a check valve 29, which discharges medium 3 from system 1 during normal operation, i.e. during proper treatment of the medium. When a warning signal has been output, the outlet of the T-valve is switched over and medium 3 is fed back via a bypass within system 1 and returned to conveying line 6 at a point which is located in the flow direction upstream of electroporator 2. Medium 3 could be circulated within system 1 by way of such a bypass line until the desired change of the condition parameter in the medium has been reached and the output of the warning signal is canceled.

In the embodiment of FIG. 1 shown by way of example, evaluation device 5 compares the determined temperature increase of the medium during the treatment in electroporator 2 to a predetermined target temperature increase and outputs a warning signal once the difference between the determined temperature increase and the predetermined target temperature increase exceeds a limit value.

The target temperature increase can be calculated according to the following formula 1:

$$\Delta T = \frac{W_{spec}}{c_p} * f,$$

where $W_{spec}$ is the specific energy input, $c_p$ is the specific heat capacity of the medium, and f is a correlation factor. The correlation factor can take into account, for example, the type of medium, the desired treatment intensity in the electroporator, the pH value, the conductivity of the medium or other factors.

To ensure that electroporator 2 introduces the required specific energy input into the medium, the system according to the invention can have an energy measuring unit 30 for determining the specific energy input into medium 3 during the treatment with the pulsed electric field. Energy measuring unit 30 can determine the specific energy input in dependence of the determined conveying speed and the operating parameters of electroporator 2. The operating parameters of the electroporator can be determined, for example, by an oscilloscope 31 which determines the time profile of the pulse voltages of capacitor 11, including, for example, the pulse duration, the pulse frequency, the pulse shape and optionally the strength of current generated. The parameters determined by oscilloscope 31 can be transmitted via a signal ine 32 from oscilloscope 31 to energy measuring unit 30.

In the exemplary embodiment shown, oscillator 31 is shown as an integral component of electroporator 2. It is just as well possible to integrate the oscilloscope into evaluation unit 5 or to design it as a separate component.

In the exemplary embodiment shown, energy measuring unit 30 is integrated into evaluation unit 5 by way of example, which is advantageous because evaluation unit 5 receives a signal that is characteristic of the conveying speed via signal line 19 and the operating parameters of electroporator 2 from the oscilloscope 31 via signal line 32 and can determine from these parameters the specific energy input into the medium during treatment with the pulsed electric field. Of course, it is also possible to not integrate energy measuring unit 30 into evaluation unit 5, but to design it as a separate unit or even to integrate it into electroporator 2, which would require a further signal line between electroporator 2 and speed sensor 18.

The exemplary system 1 of FIG. 1 further comprises a pressure measuring unit 37 for determining the pressure in medium 3 after treatment in electroporator 2. The system can further comprise an overpressure indicator for outputting a warning signal once the determined pressure in medium 3 exceeds a predetermined maximum pressure. In the embodiment shown, overpressure indicator 38 is integrated into pressure measuring unit 37 and can transmit the warning signal via a signal line 39 to the evaluation unit when a maximum pressure has been exceeded, which in turn can initiate suitable measures, for example, blocking media discharge. Overpressure indicator 38 could also be integrated into evaluation unit 5. In this case, pressure measuring unit 37 would output a signal that is characteristic of the determined pressure in the medium via signal line 39 to evaluation unit 5 which compares this signal to a maximum permissible maximum pressure and outputs a warning signal in the event that the pressure in the medium has exceeded this. Monitoring the pressure in medium 3 after the treatment in electroporator 2 is advantageous in that a disproportionate pressure increase in the medium can be due to the fact that over-treatment of medium 3 in electroporator 2, i.e. excessive energy input has taken place, which is expressed by undesirable foaming. The foaming leads to a pressure increase in medium 3 and can be caused by unwanted reactions in the medium.

System 1 according to the invention of the exemplary embodiment of FIG. 1 further comprises a logging unit 33 for logging operating parameters of the system. The operating parameters can be logged in the logging unit, in particular, in their temporal course and stored for documentation purposes. In the embodiment shown, logging unit 33 is connected via a signal line 34 to evaluation unit 5 in a data or signal transmitting manner. As indicated by the box drawn in dashed lines, system 1 can comprise a central control and monitoring center 35 which comprises evaluation unit 5, control unit 15 and logging unit 33, in which the signals for all determined operating parameters of system 1 are received, and from which all control signals including the warning signals are output.

Control and monitoring center 35 can comprise an interface for data input for delivering the predetermined change target value to evaluation unit 5. A graphical user interface can be provided via which the user can retrieve information of the system, can intervene in the settings of system 1, or can access data stored in memory 36 of the logging unit.

With system 1 according to the invention or the method according to the invention, a HACCP-compliant system or method for the preservation of foods can be provided, in which the destruction of harmful microorganism in the medium which is required for the preservation and achieved by applying a pulsed electric field in electroporator 2, is monitored in that a certain increase in temperature in medium 3 is caused, which is indicative of the successful treatment for the preservation of the foods, and which in the event of inadequate treatment outputs a warning and can prevent the further processing of an improperly treated medium.

REFERENCE NUMERALS 1 system
2 electroporator
3 medium
4 measuring device
5 evaluation device
6 conveying line
7 tubing
8 drive
9 conveyor system
10 electrodes
11 capacitors
12 power lines
13 voltage source
14 pulse generator
15 control unit
16 control line
17 control line
18 speed sensor
19 signal line
20 signal line
21 pH measuring unit
22 signal line
23 inlet thermometer
24 outlet thermometer
25 signal line
26 signal line
27 control line
28 blocking device
29 check valve
energy measuring unit
31 oscilloscope
32 signal line
33 logging unit
34 signal line
35 control center
37 pressure measuring unit
38 over pressure indicator
39 signal line

The invention claimed is:

1. A system (1) for process monitoring of the treatment of media (3), including an HACCP-compliant system (1) for the preservation of foods, comprising an electroporator (2) for treating a medium (3) with a pulsed electric field, at least one measuring device (4) for determining a temperature increase of said medium (3) caused by the treatment with said pulsed electric field, where said measuring device (4) comprises at least one inlet thermometer (23) for determining the temperature of said medium before it enters said electroporator (2) and at least one outlet thermometer (24) for determining the temperature of the medium after it exits said electroporator (2), and an evaluation device (6) for comparing the determined temperature increase to a predetermined temperature increase and for outputting a warning signal once the difference between the determined temperature increase and the predetermined temperature increase exceeds a limit value.

2. The system (1) according to claim 1, further comprising a conveying line (6) and a drive (7) for transporting said medium (3).

3. The system (1) according to claim 2, further comprising a speed sensor for determining the conveying speed of said medium (3) transported on said conveying line (6) through said electroporator (2).

4. The system (1) according to claim 2, where the electroporator (2) comprises at least two electrodes (10) connected to a pulse generator (14).

5. The system (1) according to claim 2, further comprising a logging unit (33) for logging operating parameters of said system (1).

6. The system (1) according to claim 2, further comprising a blocking device (28) for preventing medium (3) from exiting said system (1) when said warning signal has been outputted.

7. The system (1) according to claim 1, where the electroporator (2) comprises at least two electrodes (10) connected to a pulse generator (14).

8. The system (1) according to claim 1, further comprising a control unit (15) for adjusting a conveying speed of said medium (3) or at least one operating parameter of said electroporator (2).

9. The system according to claim 8, wherein the control unit (15) is configured for adjusting a conveying speed of said medium (3) and at least one operating parameter of said electroporator (2).

10. The system (1) according to claim 1, further comprising an energy measuring unit (30) for determining the specific energy input into said medium (3) during the treatment with said pulsed electric field.

11. The system (1) according to claim 10, where said energy measuring unit (30) determines the specific energy input in dependence of the determined conveying speed and operating parameters of said electroporator (2).

12. The system (1) according to claim 10, where said energy measuring unit (30) comprises an oscilloscope (31).

13. The system (1) according to claim 1, where said evaluation device (5) comprises an evaluation unit for comparing the determined temperature increase of said medium (3) to a predetermined target temperature increase and for outputting a warning signal once the difference between the determined temperature increase and the predetermined temperature increase exceeds a limit value, where the target temperature increase is calculated according to the following formula:

$$\Delta T = \frac{W_{spec}}{c_p} * f,$$

where $W_{spec}$=specific energy input, $c_p$=specific heat capacity of said medium (3) and f=correlation factor.

14. The system (1) according to claim 1, further comprising a logging unit (33) for logging operating parameters of said system (1).

15. The system (1) according to claim 1, further comprising a blocking device (28) for preventing medium (3) from exiting said system (1) when said warning signal has been outputted.

16. The system (1) according to claim 1, further comprising a pressure measuring unit for determining the pressure in said medium (3) after treatment in said electroporator (2).

17. The system (1) according to claim 16, further comprising an overpressure indicator (38) for outputting a warning signal once the determined pressure in said medium (3) exceeds or drops below a predetermined maximum pressure.

18. The system (1) according to claim 1, further comprising a pH measuring unit for determining the pH value of said medium (3) before it enters said electroporator (2).

19. A system (1) for process monitoring of the treatment of media (3), including an HACCP-compliant system (1) for the preservation of gods, comprising a conveying line (6) and a drive (7) for transporting said medium (3), an electroporator (2) for treating a medium (3) with a pulsed electric field, a speed sensor for determining conveying speed of said medium (3) transported on said conveying line (6) through said electroporator (2), at least one Measuring device (4) for determining a temperature increase of said medium (3) caused by the treatment with said pulsed electric field, where said measuring device (4) comprises at least one inlet thermometer (23) for determining the temperature of said medium before it enters said electroporator (2) and at least one outlet thermometer (24) for determining the temperature of the medium after t exits said electroporator (2), a control unit (15) for adjusting a conveying speed of said medium (3) or at least one operating parameter of said electroporator (2), and an evaluation device (5) for comparing the determined temperature increase to a predetermined temperature increase and for outputting a warning signal once the difference between the determined temperature increase and the predetermined temperature increase exceeds a limit value, wherein the control unit is configured to adjust a parameter of the electroporation in dependence of the determined conveying speed.

20. The system according to claim 19, wherein the control unit (15) is configured for adjusting a conveying speed of said medium (3) and at least one operating parameter of said electroporator (2).

* * * * *

UNITED STATES PATENT AND TRADEMARK OFFICE
CERTIFICATE OF CORRECTION

PATENT NO. : 12,041,953 B2
APPLICATION NO. : 16/963310
DATED : July 23, 2024
INVENTOR(S) : Stefan Toepfl et al.

It is certified that error appears in the above-identified patent and that said Letters Patent is hereby corrected as shown below:

In the Specification

Column 1, Line 59: Delete "en", and insert --an--.

Column 2, Line 62: Delete "value", and insert --limit value--.

Column 3, Line 44: Delete "ine", and insert --line--.

Column 3, Line 63: Delete "warring", and insert --warning--.

Column 5, Line 41: Delete "k", and insert --it--.

Column 5, Line 42: Delete "ne", and insert --line--.

Column 5, Line 42: Delete "filed", and insert --filled--.

Column 7, Line 1: Delete "ine", and insert --line--.

Column 7, Line 12: Delete "ine", and insert --line--.

Column 8, Line 22: Delete "al", and insert --all--.

In the Claims

Claim 1, Line 12 (Column 12, Line 18): Delete "(6)", and insert --(5)--.

Claim 19, Line 3 (Column 13, Line 31): Delete "gods", and insert --foods--.

Signed and Sealed this
Fifteenth Day of October, 2024

Katherine Kelly Vidal
*Director of the United States Patent and Trademark Office*

Claim 19, Line 11 (Column 14, Line 8): Delete "Measuring", and insert --measuring--.

Claim 19, Line 18 (Column 14, Line 15): Delete "t", and insert --it--.